July 7, 1931.  J. A. LETHERT  1,813,060
NONDETACHABLE IDENTIFICATION TAG
Filed July 12, 1929
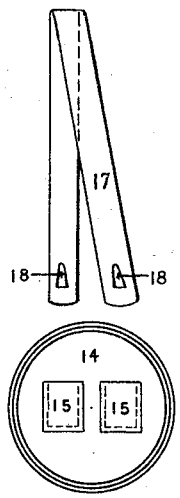
Fig.1.
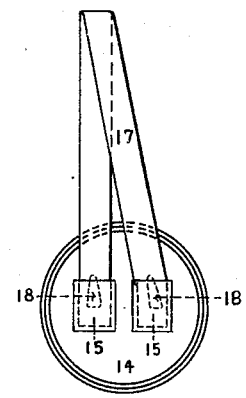
Fig.2.
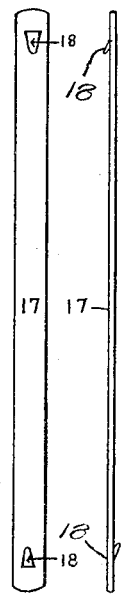
Fig.3. Fig.6.
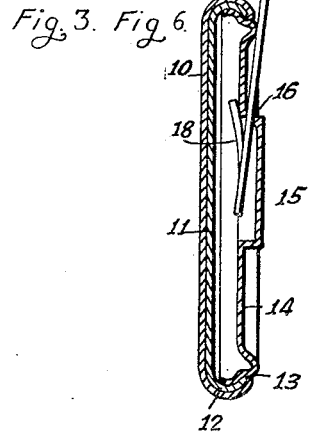
Fig.7.
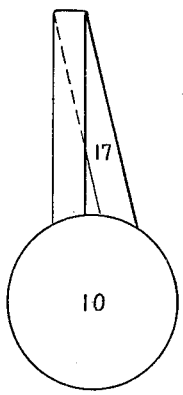
Fig.5.
Fig.4.
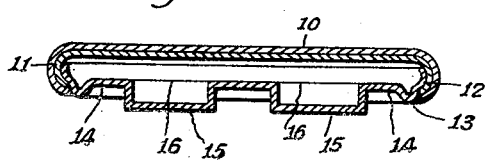
WITNESSES
John A. Lethert
INVENTOR
BY Charles A. Lethert
ATTORNEY Patented July 7, 1931

1,813,060

UNITED STATES PATENT OFFICE

JOHN A. LETHERT, OF ST. PAUL, MINNESOTA

NONDETACHABLE IDENTIFICATION TAG

Application filed July 12, 1929. Serial No. 377,906.

This invention relates to an identification tag of a non-transferable type such as is adapted to be used by persons or parties for identification purposes at dances, exhibitions, fairs, theaters, or at any form of social or business function, or for the identification of animals, fowls, carcasses, articles, or objects of other kinds while being transported, exhibited or on sale.

The purpose of the invention is to provide a device of the general nature described in which the undetected transfer of the tag from one person, animal, fowl, carcass, article or object to another is effectually prevented. This desirable result is achieved by making use of a tag member having a shell-like structure and having pockets formed in its rearmost wall in which laterally disposed openings provide for the entrance into the pockets of expansible anchor members formed on the end of a steel tape loop capable of being passed through a buttonhole or the like of a garment, or attached to any animal, fowl, carcass, article, or object. The provision of the expansible anchoring members effectually prevents the withdrawal of the loop from its anchored position in the tag member proper without rupture of the loop.

In the drawings, in which a preferred embodiment of the invention has been selected for illustration, Figure 1 is a view of the rear face of the tag showing the attaching loop ready to be forced into anchoring position.

Figure 2 is a view similar to Figure 1 showing the anchoring members of the loop occupying their holding position within seats provided for the purpose in the tag.

Figure 3 is a view of the loop member detached from the tag.

Figure 4 is a view in cross-section taken through a mid-portion of the device shown in Figures 1 and 2.

Figure 5 is a face view of the tag shown in Figures 1 and 2.

Figure 6 is a side view of the steel tape showing the anchoring points projecting therefrom.

Figure 7 is a view in side cross-section taken through a mid-portion of the pocket shown in Figures 1 and 2.

Referring to the drawings for a more detailed description of the invention, there is shown at 10 a tag member or marker adapted to have provided on the face thereof any desired legendary matter, symbol, or the like, such as the name of a club, theatre, dance hall, or other name, number, price, description, letter or the like. The tag member 10 is preferably formed of a shell-like formation such as is shown in Figure 4 of the drawings wherein the face member 11 of the tag is provided with a rearwardly extending circular flange 12 which is adapted to receive a corresponding flange 13 on the rear body wall member 14.

The rearward wall member 14 of the tag is provided with a pair of outwardly projecting bosses 15 which, as will be seen, serve to form pockets or seats for a pair of loop anchoring members hereinafter referred to. The pocket members 15 are provided at one end with openings 16 through which can be passed the anchoring ends of the loop member referred to.

At 17 is shown the loop member and it is preferably formed of a section of steel tape, or wire, or other adjustable material, and in use is formed with a generally U-shaped conformation as is clearly indicated in the drawings. The extremities of this member are provided with outwardly extending barb or hook members 18 which normally tend to open outwardly to the position shown in Figure 3 of the drawings.

It will be seen that as is shown in Figure 1 of the drawings the barbed ends of the loop 17 may be pressed through the adjacent openings 16 of the seats or pockets 15 and that the barbs will yield and bend inwardly toward the side or center members of the loop 17 in order to pass through the openings 16. It will also be seen that when the barb members have passed into the pockets beyond the edges of the openings they will expand and take the position indicated in Figure 2 and Figure 7 of the drawings wherein they effectually prevent the withdrawal of the loop from its anchored position as will be seen.

It is wholly obvious that the tag thus described is equally well adapted as a transportation or baggage check and for various identification purposes.

What I claim is:—

1. An identification device comprising a tag and a bendable element adapted to embrace an object to secure the tag thereto, the tag comprising a front wall and a rear wall secured to the front wall and having a pair of outwardly bulged portions providing pocket members, each pocket member having an entrance to the space therein through one of the side walls, and the bendable element being provided at its opposite extremities with ends passing through the respective entrances into said pockets and resilient tongues on said ends, each tongue interlocking with a wall of the respective entrance and being normally spaced at its extremity from the body of said end to such degree as to require compression of the tongue during insertion of the end into the pocket.

2. In an identification tag of the non-transferable type, a tag member provided with a pair of outwardly bulged members on the rear face thereof, each of said bulged members having a restricted opening in corresponding lateral edges thereof, and an attaching member formed of steel tape or wire with the free ends thereof turned rearwardly at an angle to the stem portions of the member whereby to receive the rearwardly turned end of the loop in anchoring relation therein.

Dated this 9th day of July, 1929.

JOHN A. LETHERT.